(12) United States Patent
Shahin

(10) Patent No.: US 11,976,700 B2
(45) Date of Patent: May 7, 2024

(54) BRAKE PAD ASSEMBLY FOR A DISK BRAKE SYSTEM AND DISK BRAKE SYSTEM

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaek-si (KR)

(*) Notice: Subject to any disclaimer, the term of this patent is extended or adjusted under 35 U.S.C. 154(b) by 17 days.

(21) Appl. No.: 17/697,187

(22) Filed: Mar. 17, 2022

(65) Prior Publication Data
US 2022/0316538 A1    Oct. 6, 2022

(30) Foreign Application Priority Data
Mar. 31, 2021 (DE) .................... 10 2021 203 287.7

(51) Int. Cl.
*F16D 65/78* (2006.01)
*F16D 65/00* (2006.01)
(Continued)

(52) U.S. Cl.
CPC ....... *F16D 65/0006* (2013.01); *F16D 65/095* (2013.01); *F16D 55/225* (2013.01);
(Continued)

(58) Field of Classification Search
CPC .... F16D 65/0006; F16D 65/02; F16D 65/095; F16D 65/097; F16D 65/0971;
(Continued)

(56) References Cited

U.S. PATENT DOCUMENTS 5,762,166 A * 6/1998 Yano ................... F16D 65/0006
                                                      188/264 G
6,481,545 B1 * 11/2002 Yano ....................... B32B 15/06
                                                      188/264 G
(Continued)

FOREIGN PATENT DOCUMENTS

DE          19706122 A1    8/1998
DE          69612183 T2    8/2001
(Continued)

OTHER PUBLICATIONS

German Office Action dated Oct. 8, 2021, in connection with the German Patent Application No. 10 2021 203 287.7.
(Continued)

*Primary Examiner* — Christopher P Schwartz
(74) *Attorney, Agent, or Firm* — Hauptman Ham, LLP

(57) ABSTRACT

The application relates to a brake pad assembly (2) for a disk brake system. Further, the application relates to a disk brake system. The proposed brake pad assembly (2) comprises a back plate (4) having a front side for facing a brake disk (1) of the disk brake system and a back side (6). The brake pad assembly (2) further comprises a friction layer (3) arranged at the front side of the back plate (4) for contacting a friction surface the brake disk (1). In addition, the brake pad assembly (2) comprises a shim (5, 8, 12). The shim (5, 8, 12) comprises a copper layer (7, 11, 13, 17) for reducing squeal noises. The shim (5, 8, 12) is arranged on the back side (6) of the back plate (4).

14 Claims, 2 Drawing Sheets

Figure 1:
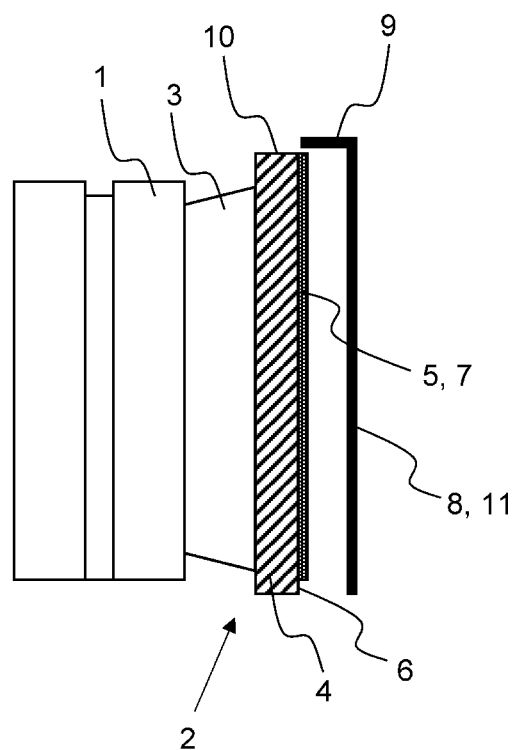

(51) Int. Cl.
*F16D 65/095* (2006.01)
*F16D 55/225* (2006.01)

(52) U.S. Cl.
CPC ............... *F16D 2200/0026* (2013.01); *F16D 2250/0069* (2013.01)

(58) Field of Classification Search
CPC ........... F16D 55/125; F16D 2200/0026; F16D 2250/0069
USPC .............................. 188/250 B, 250 G, 251 A
See application file for complete search history.

(56) References Cited

U.S. PATENT DOCUMENTS

| | | | | |
|---|---|---|---|---|
| 8,869,955 | B2* | 10/2014 | Parild | B32B 38/0004 188/251 A |
| 8,967,338 | B2* | 3/2015 | Wakabayashi | F16D 65/0971 188/73.31 |
| 10,125,836 | B2* | 11/2018 | Arbesman | F16D 55/225 |
| 2004/0222055 | A1* | 11/2004 | Niwa | F16D 65/0971 188/250 E |
| 2014/0339028 | A1* | 11/2014 | Kobayashi | F16D 65/0006 188/250 B |
| 2023/0141199 | A1* | 5/2023 | Shahin | F16D 65/0006 188/73.38 |
| 2023/0151857 | A1* | 5/2023 | Shahin | F16D 65/092 188/73.31 |
| 2023/0167865 | A1* | 6/2023 | Shahin | B32B 27/42 188/72.1 |
| 2023/0228307 | A1* | 7/2023 | Shahin | F16D 65/0978 188/73.38 |

FOREIGN PATENT DOCUMENTS

| | | | | |
|---|---|---|---|---|
| DE | 102012023012 A1 * | 6/2014 | | F16D 65/0006 |
| DE | 102014213410 A1 | 1/2016 | | |
| DE | 102017210551 A1 * | 12/2018 | | F16D 65/02 |
| JP | 2002-295548 A | 10/2002 | | |
| JP | 2009-264443 A | 11/2009 | | |
| JP | 2013-61011 A | 4/2013 | | |
| JP | 2017-3106 A | 1/2017 | | |
| KR | 10-2010-0017352 A | 2/2010 | | |

OTHER PUBLICATIONS

Korean Office Action dated Dec. 10, 2023 for corresponding Korean Patent Application No. 10-2022-0032859, along with English machine translation (8 pages).

* cited by examiner

BRAKE PAD ASSEMBLY FOR A DISK BRAKE SYSTEM AND DISK BRAKE SYSTEM

CROSS-REFERENCE TO RELATED APPLICATIONS

This application claims priority under 35 U.S.C. § 119 to German Provisional Patent Application No. 10 2021 203 287.7, filed on Mar. 31, 2021, in the German Patent and Trademark Office (DPMA), the contents of which are herein incorporated by reference in their entirety The application relates to a brake pad assembly for a disk brake system. Further, the application relates to a disk brake system.

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, and an underlayer connecting the friction material to the back plate. While these solutions can help improve the squeal noise characteristics, in most cases these solutions work well only under specific braking conditions (low or high frequency, cold or warm temperature). Prior art can be found, e.g., in document DE 197 06 122 A1.

In view of the above-mentioned aspects, it is an object of the present invention to provide an improved brake pad assembly for a disk brake system. In particular, it is an object of the application to provide a compact and robust brake pad assembly, which reliably suppresses squeal noises over a wide range of braking conditions, in particular in hot conditions. In addition, it is an object of the application to provide an improved disk brake system having these advantages.

This objective is achieved by a brake pad assembly for a disk brake system comprising the features of claim 1. Optional further features and further developments will become apparent from the dependent claims and the detailed description in conjunction with the accompanying figures.

The proposed brake pad assembly for a disk brake system comprises a back plate having a front side for facing a brake disk of the disk brake system and a back side. The brake pad assembly further comprises a friction layer arranged at the front side of the back plate for contacting a friction surface the brake disk. In addition, the brake pad assembly comprises a shim. The shim comprises a copper layer for reducing squeal noises. The shim is arranged on the back side of the back plate.

By way of the copper layer, an improved squeal noise reduction can be achieved. In particular, it has been found that due to the internal structure of the copper layer, a higher damping in hot conditions is achieved, as compared with other materials, e.g., steel. Further, the copper layer improves the noise characteristics by decoupling the modes of the vibrating disk brake system in normal, radial and tangential directions. Thereby, the copper layer achieves an improved reduction of sound pressure level in a wide range of frequencies.

The term copper layer may be understood to mean a layer made of copper. The copper layer may in some embodiments, but does not necessarily, consist of pure copper. However, the damping effect can be improved in an embodiment, in which the copper layer contains at least 50% copper by weight. For example, the copper layer may consist of or contain an alloy containing copper. For further improvement of the noise cancelling characteristics, the copper layer contains at least 70% copper by weight.

In some embodiments, a thickness of the copper layer is less than 0.6 mm. In particular, a thickness of the copper layer may be less than 0.3 mm. The ability to use a copper layer that is thin stems from the improved noise reduction characteristics of the copper material. In some embodiments, the thickness of the copper layer may even be less than 0.25 mm or 0.2 mm. In this manner, material costs and a total thickness of the brake pad assembly may be reduced while ensuring sufficient noise reduction, so that a particularly inexpensive and compact arrangement is achieved.

In some embodiments, the shim only consists of the copper layer. However, in other embodiments, the shim may have further components. An area of the copper layer may correspond to an area of the shim. In case the shim contains components other than the copper layer, an area of the copper layer typically corresponds to at least 75%, in particular at least 90%, of an area of the shim. In some embodiments, the copper layer is sized such that it covers at least 30%, in particular at least 50% or at least 75% of an area of the back side of the back plate for effective noise reduction. The back side of back plate typically faces away from the front side of the back plate, from the friction layer, and/or from the brake disk.

In some embodiments, the shim comprises a metal layer glued to the copper layer. In particular, the metal layer may be glued directly to the copper layer. In this manner, the noise reduction properties of the brake pad assembly are further improved. A glue layer may be arranged between the copper layer and the metal layer. The glue layer may have a thickness of at least 0.05 mm and/or at most 0.2 mm. The glue layer can hold the copper layer and the metal layer together. Further, the glue layer itself may contribute to the noise damping properties of the brake pad assembly, in particular by decoupling tangential modes.

The metal layer may be a steel layer in some embodiments. However, in most embodiments the metal layer also contains copper for improved noise reduction properties. The metal layer may have any or all of the characteristics described above or below with regard to the copper layer. The thickness of the copper layer and the metal layer glued to the copper layer according to this embodiment may each be chosen to be comparatively small while maintaining the advantageous noise damping characteristics of the brake pad assembly. For example, the copper layer and the metal layer may each have a thickness of less than 0.25 mm or less than 0.2 mm. The copper layer and the metal layer have different thicknesses.

In some embodiments, the shim is glued to the back side of the back plate. In particular, the shim may be glued to the back side of the back plate such that the copper layer is glued directly to the back side of the back plate. A glue layer may be arranged between the copper layer and the back side of the back plate. As for the glue layer described above, the glue layer between the back side of the back plate and the copper layer may have a thickness of at least 0.05 mm and/or at most 0.2 mm.

In some embodiments, the shim comprises at least one clip for securing the shim to the back plate. Typically, the shim comprises a plurality of clips for securing the shim to the back plate. The clip may be formed as a resilient member. The clip may be configured to engage with the back plate, e.g., with an edge surface or edge surfaces of the back plate. In some embodiments, the clip is formed as a part of the copper layer, e.g., as a tab, in particular folded tab, formed by an edge portion of the copper layer. In addition, in some embodiments, the clips are formed as a part of the metal layer described above, e.g., as folded tabs formed by an edge portion of the metal layer. In some embodiments, the shim comprising at least one clip is additionally fixed to the back plate by a glue layer, rivets, and/or bolts.

The brake pad assembly may further comprise an inner shim. The inner shim may be arranged between the shim and the back side of the back plate. Further, the inner shim may comprise an inner shim metal layer. For improved noise reduction characteristics, the inner shim metal layer may be made of copper. The inner shim metal layer may comprise any or all of the features described above or below with regard to the copper layer. In some embodiments, the inner shim is glued to the back side of the back plate, in particular such that the inner shim metal layer is directly glued to the back side of back plate. The inner shim may additionally or alternatively be glued to the shim.

An advantage of using a copper layer is that it is comparatively easy to process as compared to other materials, e.g., steel. For example, the copper layer may have a smooth surface, e.g., fabricated by a surface treatment. In addition, the copper layer may have an inhomogeneous thickness. For example, the copper layer may be thicker/thinner in areas. E.g., a thickness of the copper layer may be increased by at least 10 percent in an area with respect to an average thickness of the copper layer. In this manner, the structural noise damping provided by the shim may be controlled by controlling a pressure distribution that occurs in areas of the shim. In further embodiments, the copper layer comprises one or more slots. The slots may be micro-slots and may, for example, have a width of less than 100 μm. Due to the slots in the copper layer, the noise damping properties of the shim may be further improved. In further embodiments, the shim comprises at least one through hole or a plurality of through holes. In particular, the copper layer may comprise a plurality of through holes. The through holes may be punching holes. By way of using the through holes, structural noise damping properties of the shim may be further improved.

In some embodiments, the shim comprises a coating, e.g., a rubber or polytetrafluoroethylene coating, for additional noise reduction. The coating may be arranged on an outer side of the shim facing away from the back plate. The coating may have a thickness of at least 0.2 mm and/or at most 0.8 mm, for example 0.4 mm. However, in other embodiments, due to the advantageous damping properties of the copper layer, a coating may not be necessary. For example, in one embodiment the shim does not comprise a coating on the outer side facing away from the back plate. The outer side of the shim may be formed by the copper layer, which may not be uncovered. The shim may, in some embodiments, not have a coating at all. A total thickness of the shim including the glue layers described above, if provided, but not including the clips, if provided, may amount to at least 0.2 mm and/or at most 2 mm.

The application further relates to a disk brake system. The disk brake system comprises the brake pad assembly as described above or below. Further, the disk brake system may comprise a caliper. The caliper may be a floating caliper or a fixed caliper. The disk brake system may further comprise a piston and a caliper finger movably coupled to the piston. The brake pad assembly may be mounted to one of or both of the caliper finger and the piston. In some embodiments, the other one of the caliper finger and piston does not have a brake pad assembly having a shim with a copper layer mounted to it. The disk brake system may be configured for hydraulic or electric actuation. Typically, the disk brake system comprises two brake pad assemblies as described above or below. One of these brake pad assemblies may be attached to the caliper finger while the other one of these brake pad assemblies may be attached to the piston. These brake pad assemblies are typically configured to be pressed with their friction layers against opposite surfaces of the brake disk during braking.

In typical embodiments, the shim and/or the copper layer is configured such that it does not contribute significantly to the structural stability of the brake pad assembly. The back plate, however, typically contributes significantly to the structural stability of the brake pad assembly. In most embodiments, the back plate is made of a metal, in particular steel. A thickness of the back plate may be at least 3 mm and/or at most 8 mm.

The friction layer can have a thickness of at least 8 mm and/or at most 15 mm, for example. The material of the friction layer can for instance comprise at least one of copper, iron sulphide, graphite, zinc powder, basalt, calcium carbonate, tin sulphide, zinc aluminium, phenolic resin, rubber dust and mineral fiber. These materials show good stopping performance and heat transfer when engaging with the brake disk.

Exemplary embodiments will be described in conjunction with the following figures.

Figure 2:
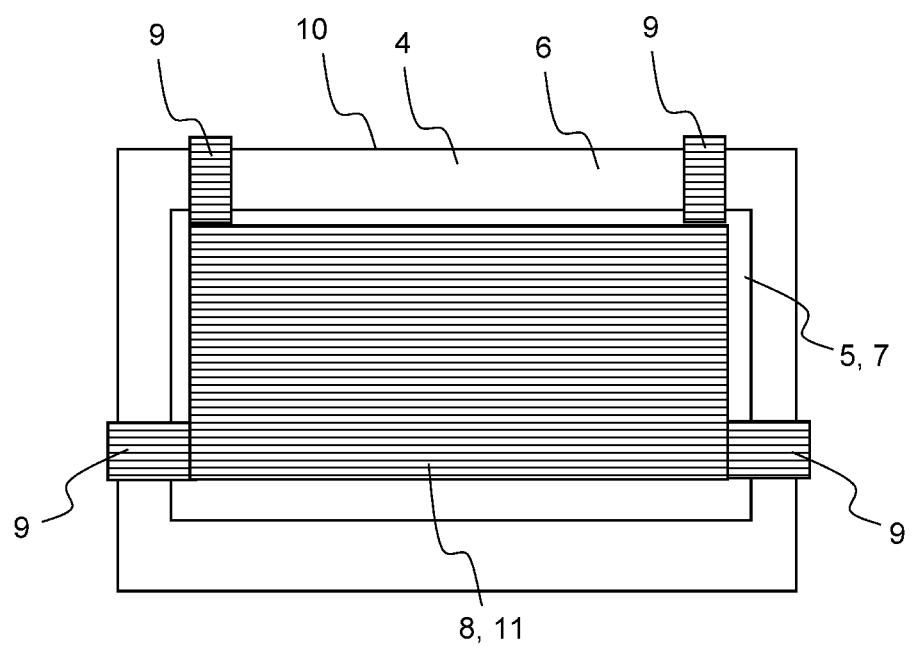
Figure 3:
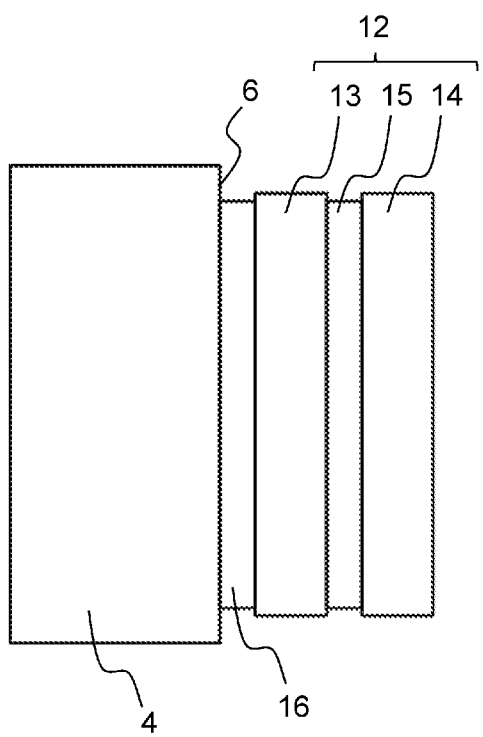
Figure 4:
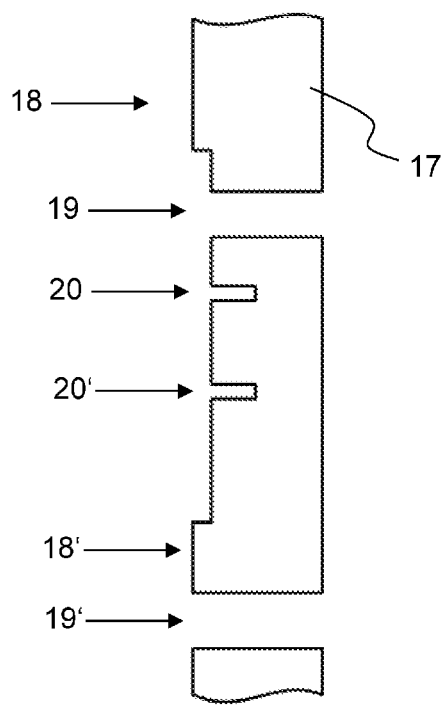

FIG. 1 shows a schematic cross sectional illustration of a brake pad assembly and a brake disk, FIG. 2 shows a schematic view of the brake pad assembly, FIG. 3 shows a schematic cross sectional view of the brake pad assembly according to another embodiment, and FIG. 4 shows a schematic cross sectional view of a copper layer.

FIG. 1 shows a brake disk 1 of a of a disk brake system for a vehicle. The disk brake system may comprise a caliper housing, a caliper finger and a piston (not shown). The disk brake system further comprises a brake pad assembly 2, which may be attached to the caliper finger and/or to the piston. The brake pad assembly 2 has a friction layer 3, which is pushed against a friction surface of the brake disk 1 upon hydraulic or electric actuation of the disk brake system. The friction layer 3 contains a material that shows a good stopping performance and heat transfer when engaging with the brake disk 1. The friction layer 3 is attached to a front side of a back plate 4, which provides structural stability to the brake pad assembly 2. The back plate 4 is typically held by the piston or the caliper finger such that the brake pad assembly 2 is mounted to the piston or caliper finger via the back plate 4.

A first shim 5 is mounted to a back side 6 of the back plate 4. The first shim 5 is glued to the back side 6 of the back plate 4 using a glue layer (not shown). The first shim 5 comprises a copper layer 7, which may in some embodiments be formed by a metal layer having a copper content of more than 90 percent by weight. The copper layer 7 of the first shim 5 may have a thickness of, e.g., 0.18 mm. The copper layer 7 of the first shim 5 ensures reliable suppression of squeal noises.

For further suppression of the squeal noises a second shim 8 is provided. The second shim 8 is a clip-on shim having resilient clips or tabs 9 that are configured to contact and engage with an edge surface 10 of the back plate 4 to attach the second shim 8 to the back plate 4, when the second shim 8 is installed. The second shim 8 comprises a copper layer 11, which like the copper layer 7 of the first shim 5 may in some embodiments be formed by a metal layer having a copper content of more than 90 percent by weight. Also, the copper layer 11 of the second shim 8 may have a thickness of, e.g., 0.18 mm. The resilient clips or tabs 9 are formed by folded protrusions in an edge portion of the copper layer 11 of the second shim 8.

The first shim 5 and the second shim 8 may be glued to one another in some embodiments. Also, the first shim 5 and/or the second shim 8 may additionally be fixed to the back plate 4 by using rivets or bolts. In addition, it is also possible in some embodiments, that only one of the first shim 5 and the second shim 8 comprises a copper layer 7, 11. The other one of the first shim 5 and the second shim 8 may, in some embodiments, comprise a layer made of a different metal, e.g., a steel layer, instead of the copper layer 7, 11.

The second shim 8 covers a back side of the first shim 5, the latter being arranged between the second shim 8 and the back plate 4. In this regard, the second shim 8 forms an outer shim and the first shim 5 forms an inner shim. The copper layer 7 of the first shim 5 may be referred to as an inner shim metal layer. An outer surface of the brake pad assembly 2 according to the depicted embodiment is formed by the copper layer 11 of the second shim 8. In other embodiments, an outer surface of the second shim 8 may be covered by a rubber or polytetrafluoroethylene coating.

FIG. 2 illustrates an illustration of the brake pad assembly 2 as viewed toward the brake disk 1 (not shown in this figure). Corresponding and reoccurring features shown in the different figures are denoted using the same reference numerals. As illustrated, the second shim 8 according to the exemplary embodiment comprises four resilient tabs 9 formed by different parts of the edge portion of the copper layer 11 of the second shim 8. As shown, the first shim 5 and the second shim 8 cover a substantial portion of an area of the back side 6 of the back plate 4, for example more than 50%. In other embodiments, the first shim 5 and the second shim 8 may cover more than 75% of the area of the back side 6 of the back plate 4.

FIG. 3 shows another aspect of the brake pad assembly 2. As shown, a multi-layer shim 12 is arranged on the back side 6 of the back plate 4. The multi-layer shim 12 comprises a copper layer 13 and another metal layer 14, which may in some embodiments be a steel layer or may be a copper layer in other embodiments that enable an improved noise reduction. The layers 13, 14 may have any or all of the characteristics described above or below with regard to the copper layers. In particular, the layers 13, 14 of the multi-layer shim 12 may each have a thickness of, e.g., 0.18 mm. The layers 13, 14 of the multi-layer shim 12 may be attached to one another by a glue layer 15 of the multi-layer shim 12. A thickness of the glue layer 15 may, e.g., be 0.1 mm.

The multi-layer 12 shim is attached to the back side 6 of the back plate 4 by another glue layer 16, which may also have a thickness of 0.1 mm, for example. Additionally or alternatively, the multi-layer shim 12 may be attached to the back plate 4 by other means, e.g., by resilient clips or tabs as described above. The resilient clips or tabs may in some embodiments be formed by folded edge portions of the copper layer 13 of the multi-layer shim 12 or by edge portions of the metal layer 14 of the multi-layer shim 12.

FIG. 4 illustrates means to adjust and optimize the noise damping properties of the shim. The figure illustrates a cross-sectional view of a copper layer 17, which may in some embodiments be the copper layer 7 of the first shim 5, the copper layer 11 of the second shim 8, the copper layer 13 of the multi-layer shim 12 or the metal layer 14 of the multi-layer shim 12 described above. The copper layer 17 has been processed in multiple ways to improve the noise damping characteristics of the shim. The copper layer 17 comprises regions with an increased thickness 18, 18', which may, in some embodiments have a thickness which exceeds an average thickness of the copper layer 17 by more than 10%. In addition, the copper layer 17 comprises through holes 19, 19' formed by punching to further improve the structural damping characteristics. The through holes 19, 19' extend through the entirety of the shim. Further, the copper layer 17 comprises micro-slots 20, 20', which have a width on a micrometer scale and which do not extend through the entire thickness of the copper layer 17. The slots 20, 20' further improve the structural noise damping characteristics of the shim.

Features of the different embodiments which are merely disclosed in the exemplary embodiments may be combined with one another and may also be claimed individually.

LIST OF REFERENCE NUMERALS

1 Brake disk
2 Brake pad assembly
3 Friction layer
4 Back plate
5 First shim
6 Back side of back plate
7 Copper layer of first shim
8 Second shim
9 Resilient tabs
10 Edge surface of back plate
11 Copper layer of second shim
12 Multi-layer shim
13 Copper layer of multi-layer shim
14 Metal layer of multi-layer shim
15 Glue layer of multi-layer shim
16 Glue layer
17 Copper layer
18, 18' Regions with an increased thickness
19, 19' Through holes
20, 20' Slots

The invention claimed is:

1. A brake pad assembly for a disk brake system, comprising:
   a back plate having a front side for facing a brake disk of the disk brake system and a back side, a friction layer arranged at the front side of the back plate for contacting a friction surface the brake disk,
   characterized by a shim comprising a copper layer for reducing squeal noises,
   wherein the shim is arranged on the back side of the back plate, and
   the copper layer has an inhomogeneous thickness.

2. The brake pad assembly of claim 1, wherein the shim comprises at least one clip for securing the shim to the back plate.

3. The brake pad assembly of claim 2, further comprising an inner shim that is arranged between the shim and the back side of the back plate,
   wherein the inner shim comprises an inner shim metal layer, which is made of copper.

4. The brake pad assembly of claim 3, wherein a size of the inner shim is different from a size of the shim.

5. The brake pad assembly of claim 1, wherein a thickness of the copper layer is less than 0.6 mm.

6. The brake pad assembly of claim 5, wherein the thickness of the copper layer is less than 0.3 mm.

7. The brake pad assembly of claim 1, wherein the shim comprises a plurality of through holes.

8. The brake pad assembly of claim 7, wherein the copper layer comprises one or more slots.

9. A disk brake system, comprising:
the brake pad assembly of claim 1;
a piston; and
a caliper finger movably coupled to the piston,
wherein the brake pad assembly is mounted to one of the caliper finger or the piston.

10. The disk brake system of claim 9, wherein the brake pad assembly having the shim with the copper layer is not mounted to the other one of the caliper finger and piston.

11. The brake pad assembly of claim 1, wherein the copper layer contains at least 50% copper by weight.

12. The brake pad assembly of claim 1, wherein the shim comprises a metal layer glued to the copper layer.

13. The brake pad assembly of claim 1, wherein the shim is glued to the back side of the back plate.

14. The brake pad assembly of claim 1, wherein the copper layer comprises one or more slots.

* * * * *